United States Patent
Miller (10) Patent No.: US 9,386,740 B2
(45) Date of Patent: Jul. 12, 2016

(54) ATTACHABLE TRIMMER

(71) Applicant: Kevin Daniel Miller, Beardstown, IL (US)

(72) Inventor: Kevin Daniel Miller, Beardstown, IL (US)

(*) Notice: Subject to any disclaimer, the term of this patent is extended or adjusted under 35 U.S.C. 154(b) by 0 days.

(21) Appl. No.: 14/606,890

(22) Filed: Jan. 27, 2015

(65) Prior Publication Data

US 2015/0208575 A1 Jul. 30, 2015

Related U.S. Application Data (60) Provisional application No. 61/932,369, filed on Jan. 28, 2014.

(51) Int. Cl.
| | | |
|---|---|---|
| *A01D 34/416* | (2006.01) | |
| *A01D 43/16* | (2006.01) | |
| *A01D 34/00* | (2006.01) | |
| *A01D 101/00* | (2006.01) | |

(52) U.S. Cl.
CPC .......... *A01D 34/4165* (2013.01); *A01D 34/001* (2013.01); *A01D 43/16* (2013.01); *A01D 2101/00* (2013.01)

(58) Field of Classification Search
CPC ... A01D 43/16; A01D 43/00; A01D 34/4165; A01D 34/64; A01D 34/37; A01D 34/73; A01D 34/78
USPC ......................................... 56/13.6, 13.7, 16.6
See application file for complete search history.

(56) References Cited

U.S. PATENT DOCUMENTS

| | | | | |
|---|---|---|---|---|
| 4,170,099 A | * | 10/1979 | Owens | A01D 43/16 56/12.7 |
| 4,949,536 A | * | 8/1990 | Neufeld | A01D 43/16 56/13.7 |
| 5,040,360 A | * | 8/1991 | Meehleder | A01D 43/16 56/11.6 |
| 6,474,053 B1 | * | 11/2002 | Lund | A01D 43/16 56/12.7 |
| 6,892,518 B1 | * | 5/2005 | Bares | A01D 34/82 56/10.4 |
| 7,165,382 B2 | * | 1/2007 | Mitchell, Jr. | A01D 34/84 56/12.7 |
| 8,464,504 B1 | * | 6/2013 | Huff | A01D 43/16 56/12.7 |
| 2005/0193700 A1 | * | 9/2005 | Bares | A01D 34/82 56/12.7 |
| 2010/0000192 A1 | * | 1/2010 | Robison | A01D 43/16 56/10.2 R |

* cited by examiner

*Primary Examiner* — John G Weiss (57) ABSTRACT

An attachable trimmer includes a trimming unit, an arm assembly, a limit switch, and a rod assembly as the attachable trimmer is mounted onto a mower deck of a lawn mower. The trimming unit is connected with the arm assembly while the limit switch is oppositely positioned of the trimming unit across the arm assembly. The rod assembly is connected with the arm assembly in between the trimming unit and the limit switch. The rod assembly moves the attachable trimmer in between an expanded position and a retracted position upon the user's discretion. The trimming unit is only operational when the attachable trimmer is at the expanded position as the limit switch completes an electrical circuitry to electrically power the trimming unit.

20 Claims, 6 Drawing Sheets

ATTACHABLE TRIMMER

The current application claims a priority to the U.S. Provisional Patent application serial number 61/932,369 filed on Jan. 28, 2014.

FIELD OF THE INVENTION

The present invention relates generally to a device that is used to trim grass along any edge of a lawn. More specifically the present invention is an attachment for a lawn mower that can expand and retract from a mower deck of the lawn mower as desired.

BACKGROUND OF THE INVENTION

Keeping up a lawn requires plenty of equipment and time. The lawn mower has made this task a bit less tiresome, but after using on a lawn mower for 20 minutes or perhaps a couple of hours depending on how big the lawn may be, just cutting the grass does not complete the job. There are edges along the sidewalk, fence, or other structures placed on the lawn that have uneven grass or an excess amount of grass. A regular lawn mower cannot reach these edges and especially not a riding lawn mower. So after all that time spent cutting the grass, the job is still not done. The user must then get out his or her edge trimmer, go back along each edge within the lawn and trim the edge, wasting time and energy. Not only does keeping up a lawn cost time and energy, but also money as a lawn mower by itself can get very costly. Then the user also has to bear the cost of an edge trimmer as the edge trimmer is also needed in addition to the lawn mower.

The present invention, which is an attachable trimmer, makes the task of keeping up the lawn more efficient and cost friendly. The attachable trimmer can be assembled on any lawn mower and is controlled by the user of the lawn mower. By doing this, the user only has to go around the lawn once because he or she can cut the grass and trim edges of the lawn at the same time. The user also saves money by not purchasing an edge trimmer.

DETAIL DESCRIPTIONS OF THE INVENTION

All illustrations of the drawings are for the purpose of describing selected versions of the present invention and are not intended to limit the scope of the present invention.

The present invention is an attachable trimmer for a lawn mower that is designed to cut grass along edges of a lawn when the present invention is in an expanded position. However, when the present invention is in a retracted position, the present invention does not cut grass along any edges. The positioning of the present invention with respect to the expanded position and the retracted position is controlled by the user of the present invention as desired so that the present invention can be only activated when necessary. For safety purposes, the present invention is only activated when the lawn mower is at the operational stage. In reference to FIG. 1, the present invention comprises a trimming unit 1, an arm assembly 15, a limit switch 21, and a rod assembly 24. In its general configuration, the trimming unit 1 is connected with the arm assembly 15 while the limit switch 21 is oppositely positioned of the trimming unit 1 across the arm assembly 15. The rod assembly 24 is connected with the arm assembly 15 in between the trimming unit 1 and the limit switch 21.

Figure 1:
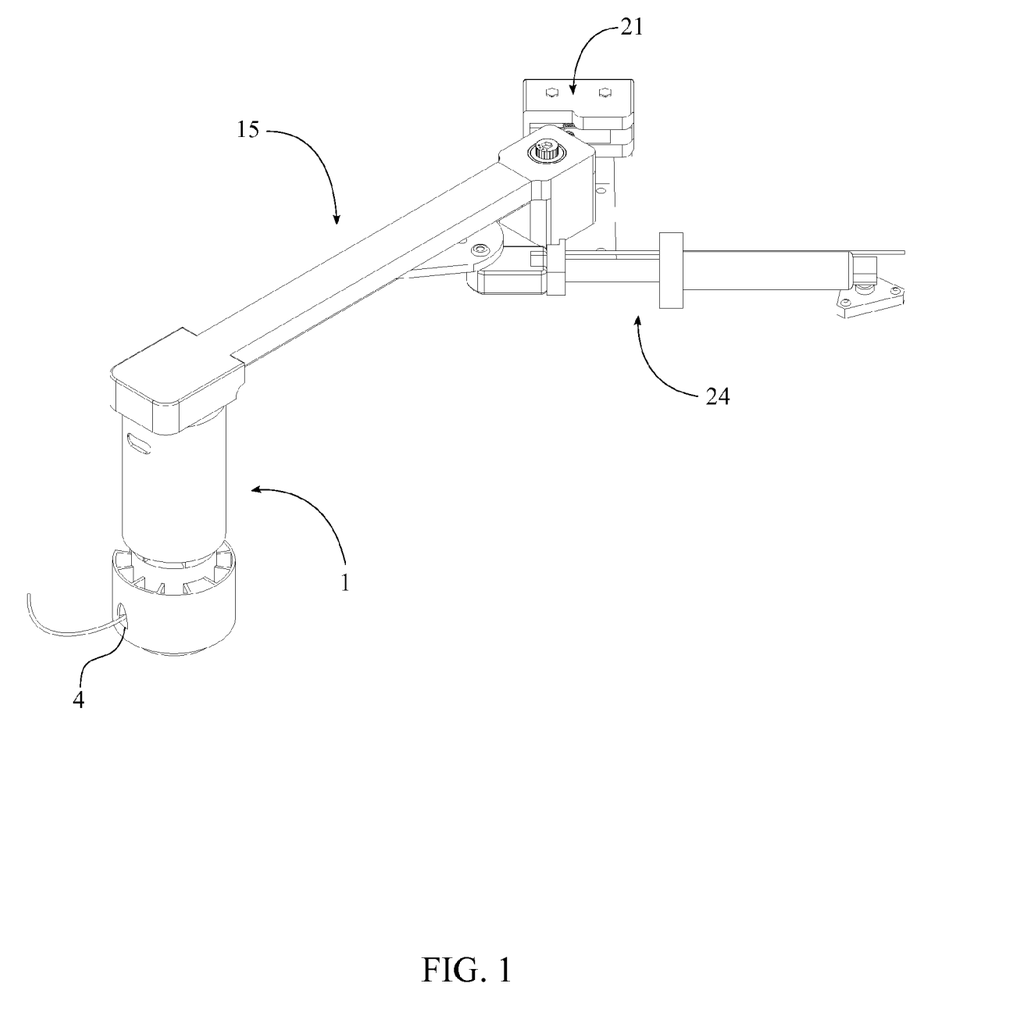
FIG. 1 is a perspective view of the completely assembled attachable trimmer.
Figure 6:
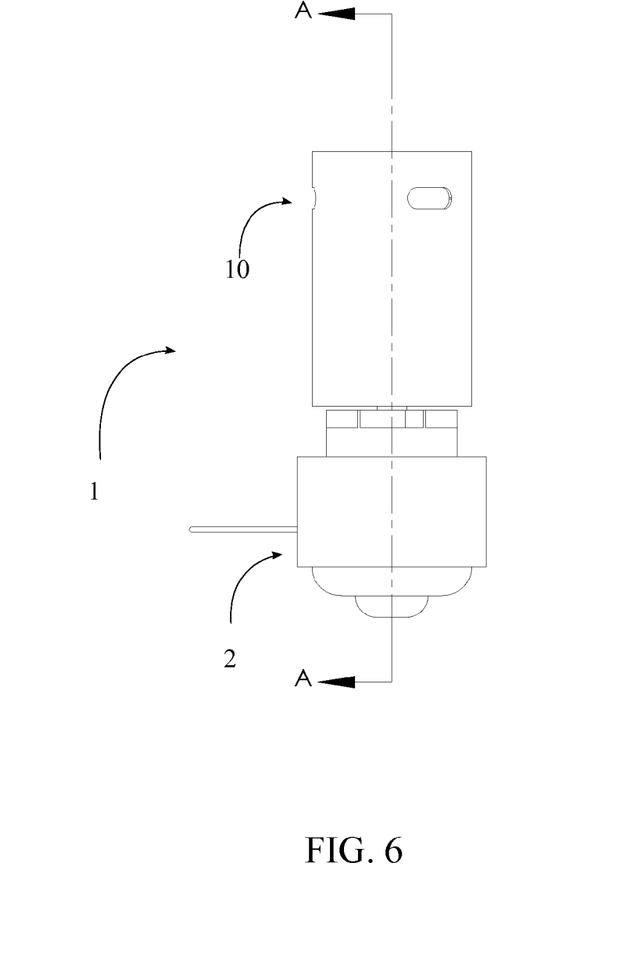
FIG. 6 is a front view of the trimming unit of the attachable trimmer, showing the plane upon which a cross sectional view is taken shown in FIG. 7.
Figure 7:
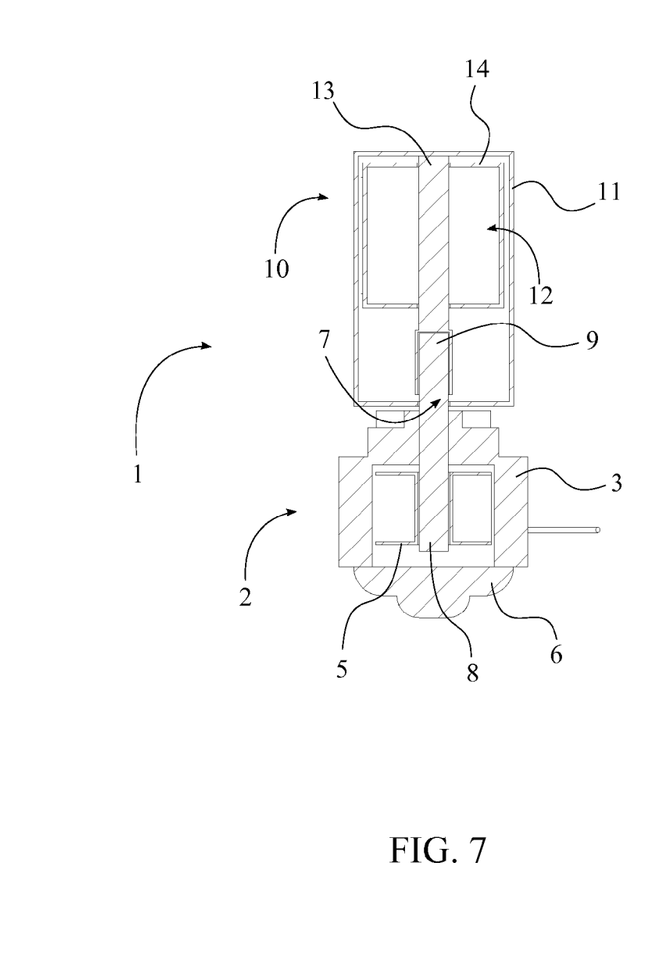
FIG. 7 is a cross section view the trimming unit of the attachable trimmer taken along line A-A of FIG. 6.

In reference to FIG. 1, FIG. 6, and FIG. 7, the trimming unit 1 functions as the rotational cutting device of the present invention as the trimming unit 1 comprises a trimmer head 2, a central adaptor 7, and a motor housing 10. The trimmer head 2 is rotatably connected with the motor housing 10 by the central adaptor 7, where the motor housing 10 is located atop the trimmer head 2. The trimmer head 2 is preferably shaped into a cylindrical shaped unit and comprises an outer housing 3, a linear spool 5, and an outer cover 6. More specifically, the central adaptor 7 is concentrically connected with the outer housing 3 in such way that a spool end 8 of the central adaptor 7 is internally positioned with the outer housing 3 while a motor end 9 of the central adaptor 7 is externally positioned with the outer housing 3 opposite of the spool end 8. The linear spool 5 concentrically attached with the spool end 8 so that the linear spool 5 is able to contain a roll of wire. The roll of wire extends through an eyelet 4 of the outer housing 3 so that the free end of the roll of wire is able to protrude through the eyelet 4 when the trimmer head 2 spins rapidly to cut grass. For efficient functionality of the roll of wire, the eyelet 4 is laterally positioned on the outer housing 3 so that the grass can be cut parallel to the ground surface. The outer cover 6 conceals the outer housing 3 and the linear spool 5 as the outer cover 6 is perimetrically attached around the outer housing 3 opposite of the motor end 9. The outer cover 6 functions a removable component so that the linear spool 5 can be replaced or recoiled once the present invention requires a new roll of wire.

In reference to FIG. 7, the motor housing 10 powers the trimmer head 2 so that the trimmer head 2 is able to achieve the rapid spinning motion as the trimmer head 2 is rotatably connected with the motor housing 10. The motor housing 10 is preferably shaped into a cylindrical shaped within the present invention and comprises an outer casing 11 and a motor 12. The motor 12 is enclosed by the outer casing 11 so that the motor 12 is able to spin while the outer casing 11 remains stationary. More specifically, a stator housing 14 of the motor 12 is internally connected with the motor housing 10 as a rotor shaft 13 of the motor 12 is connected with the motor end 9 of the central adaptor 7.

The arm assembly 15, which comprises a pivot arm 16, a connector plate 19, and a base plate 20, is adjacently connected with the motor housing 10 opposite of the trimmer head 2. The trimming unit 1 hangs from a mobile end of the arm assembly 15 and over the left side or the right side of the lawn mower as the opposite end of the arm assembly 15 is secured to the lawn mower. As displayed in FIG. 2-3, the motor housing 10 is connected with a first end 17 of the pivot arm 16, where the pivot arm 16 is preferably a rectangular extension. The base plate 20 is a relatively thin plate that is placed underneath a second end 18 of the pivot arm 16 as the base plate 20 is pivotally connected with the second end 18 of the pivot arm 16. In order to properly move in between the expanded position and the retracted position, the base plate 20 is oppositely positioned of the motor housing 10 across the pivot arm 16. The base plate 20 can comprise at least four mounting holes near the four corners so that fasteners can be inserted though the at least four mounting holes in order to securely mount the base plate 20 onto the lawn mower. Additionally, a socket head shoulder bolt is utilized to pivotally connect the pivot arm 16 as the body of the socket head shoulder bolt traverses from a top surface of the pivot arm 16 to the base plate 20 through a bottom surface of the pivot arm 16. In order to properly secure the socket head shoulder bolt within the second end 18 of the pivot arm 16, bearings may be placed within the pivot arm 16 adjacent to the top surface and the bottom surface so that the bearings are able to provide smooth rotation in between the expanded position and the retracted position. The connector plate 19 is connected with the pivot arm 16 and positioned in between the motor housing 10 and base plate 20 as the connector plate 19 is outwardly extended away from the pivot arm 16. More specifically, the connector plate 19 is positioned along the bottom surface of the pivot arm 16, where the connector plate 19 functions as a linking platform in between the arm assembly 15 and the rod assembly 24. The rod assembly 24 that controls the movement of the present invention in between the expanded position and the retracted position comprises a rod end assembly 25, a spring anchor 29, a cable 30, an air spring strut 31, and a strut base 36.

The rod end assembly 25, which comprises an anchor 26, a securing member 27, and a cable inlet 28, connects with the connector plate 19 so that the rod assembly 24 is able to connect with the arm assembly 15 through the connector plate 19. In reference to FIG. 2-3, the securing member 27 is connected with the connector plate 19 via an interlocking arrangement. The anchor 26 is connected with the securing member 27 and oppositely positioned of the connector plate 19 and the interlocking arrangement. The cable inlet 28 is positioned on the anchor 26 so that the rod end assembly 25 is able to facilitate movements of the cable 30. The air spring strut 31 is connected to the rod end assembly 25 opposite of the connector plate 19 as the strut base 36 is connected to the air spring strut 31 opposite of the rod end assembly 25.

Figure 4:
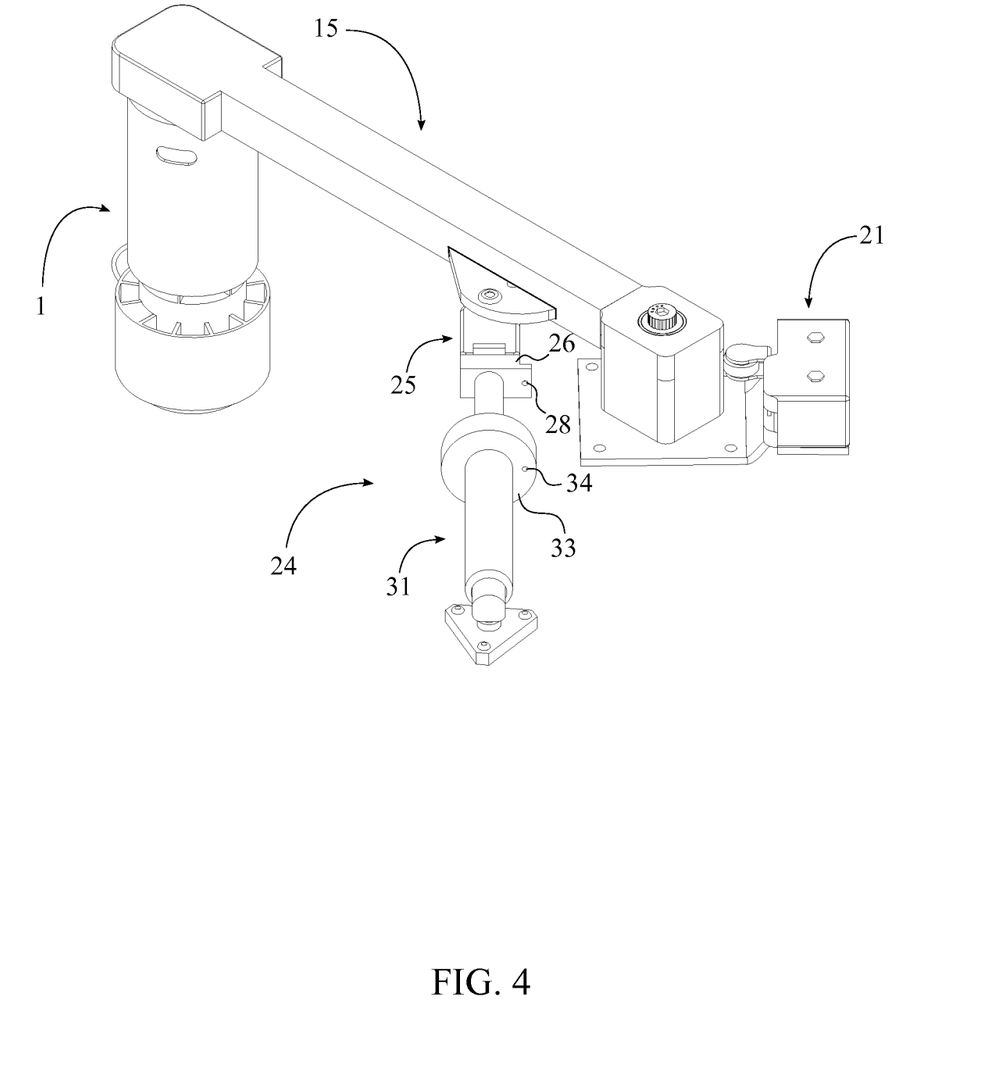
FIG. 4 is a rear perspective view of the attachable trimmer without the cable.
Figure 5:
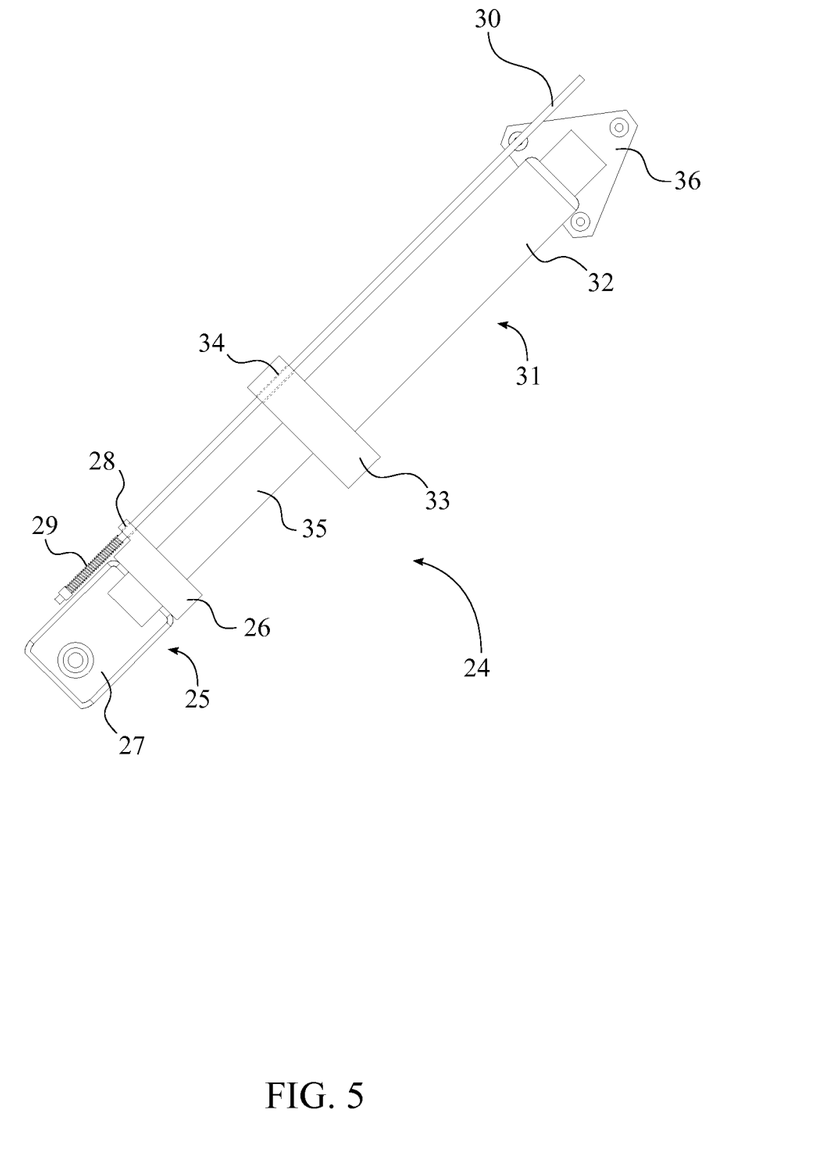
FIG. 5 is a top view of the rod assembly of the attachable trimmer.

In reference to FIG. 4-5, the air spring strut 31 comprises a pressure tube 32, a tube flange 33, a cable retainer 34, and a piston rod 35. More specifically, the pressure tube 32 is adjacently connected with the strut base 36 while the tube flange 33 is concentrically positioned around the pressure tube 32 opposite of the strut base 36. The strut base 36 is a relatively thin triangular plate that is placed underneath the pressure tube 32, opposite to the tube flange 33, and mounts the air spring strut 31 to the lawn mower. The strut base 36 contains at least three mounting holes near the three corners so that fasteners can be inserted though the at least three mounting holes. The cable retainer 34 is traversed through the tube flange 33 and concentrically positioned with the cable inlet 28 so that the air spring strut 31 is also able to facilitate movements of the cable 30.

The piston rod 35 is traversed into the pressure tube 32 and concentrically positioned with the pressure tube 32 as the piston rod 35 is also connected with the anchor 26 opposite of the pressure tube 32.

In reference to FIG. 5, the cable 30 is traversed through the air spring strut 31 and rod end assembly 25 so that the cable 30 is able to operate the present invention in between the expanded position and the retracted position. The spring anchor 29 is connected to the cable 30 and adjacently positioned with the rod end assembly 25 and the connector plate 19 so that the spring anchor 29 is able to secure the cable 30 within the present invention. More specifically, the cable 30 is traversed through the cable retainer 34 and the cable inlet 28 as the free end of the cable 30 is connected with the spring anchor 29. The spring anchor 29 allows the cable 30 to be pulled back through the cable inlet 28 and the cable retainer 34 when the pivot arm 16 is in its retracted position due to the force of the cable 30. However, the pivot arm 16 is able to move from the retracted position to the expanded position due the pressure force of the air spring strut 31 when the tension of the cable 30 is released. At the discretion of the user, he or she is able to operate the pivot arm 16 in between the expanded position and the retracted position through a turn lock, where the turn lock is tensionably connected with the cable 30 opposite of the spring anchor 29. When the turn lock is in a locking position, the present invention is in the retracted position. More specifically, the arm assembly 15 is retracted, the piston rod 35 is pulled into the pressure tube 32, and the constant pressure within the pressure tube 32 is increased. When the turn lock is in a releasing position, the present invention is in the expanded position. More specifically, the arm assembly 15 is expanded and the piston rod 35 is pushed out of the pressure tube 32 due to the constant pressure within the pressure tube 32.

Figure 2:
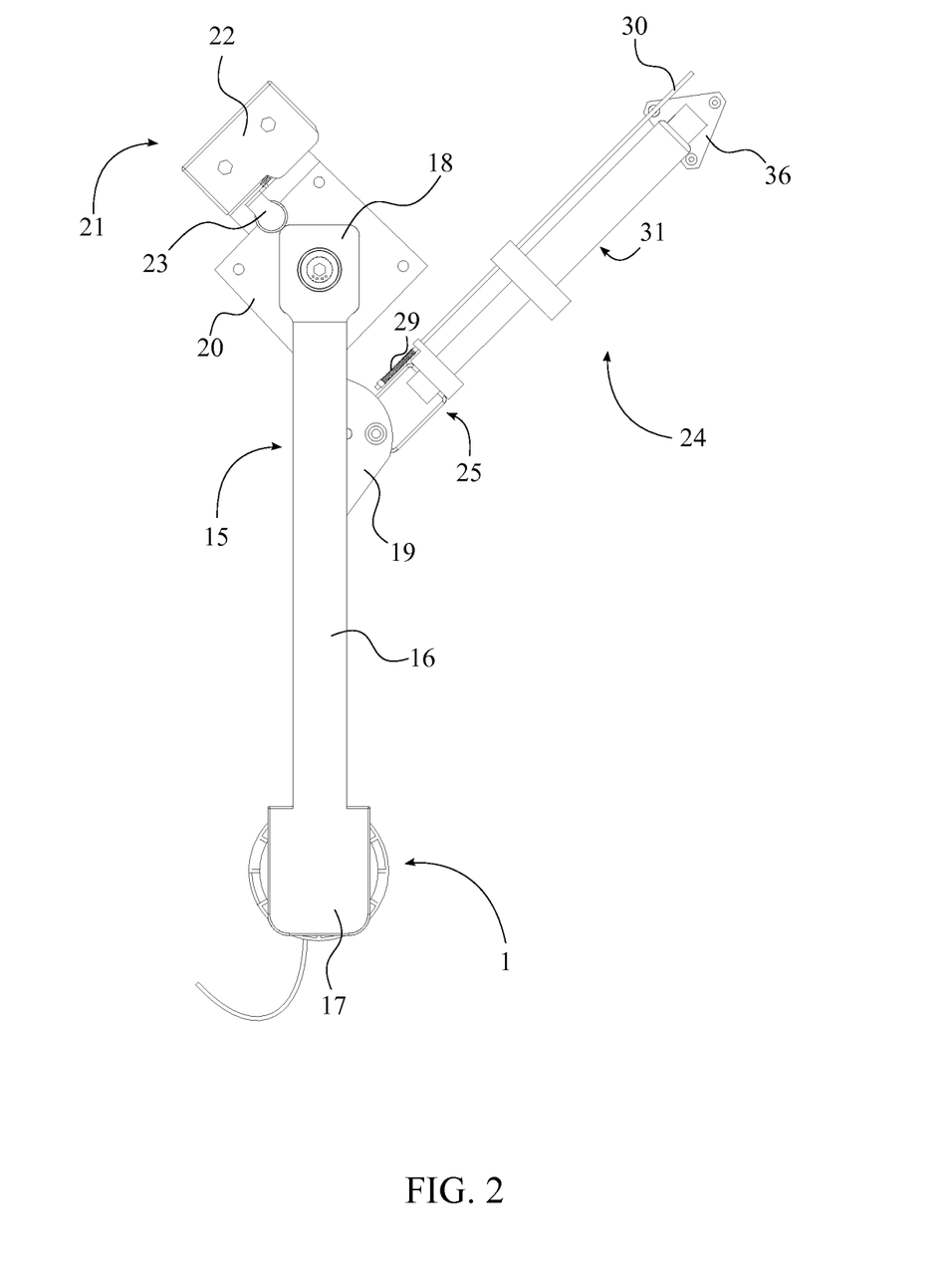
FIG. 2 is a top plan view of the attachable trimmer, showing the expanded position of the attachable trimmer.
Figure 3:
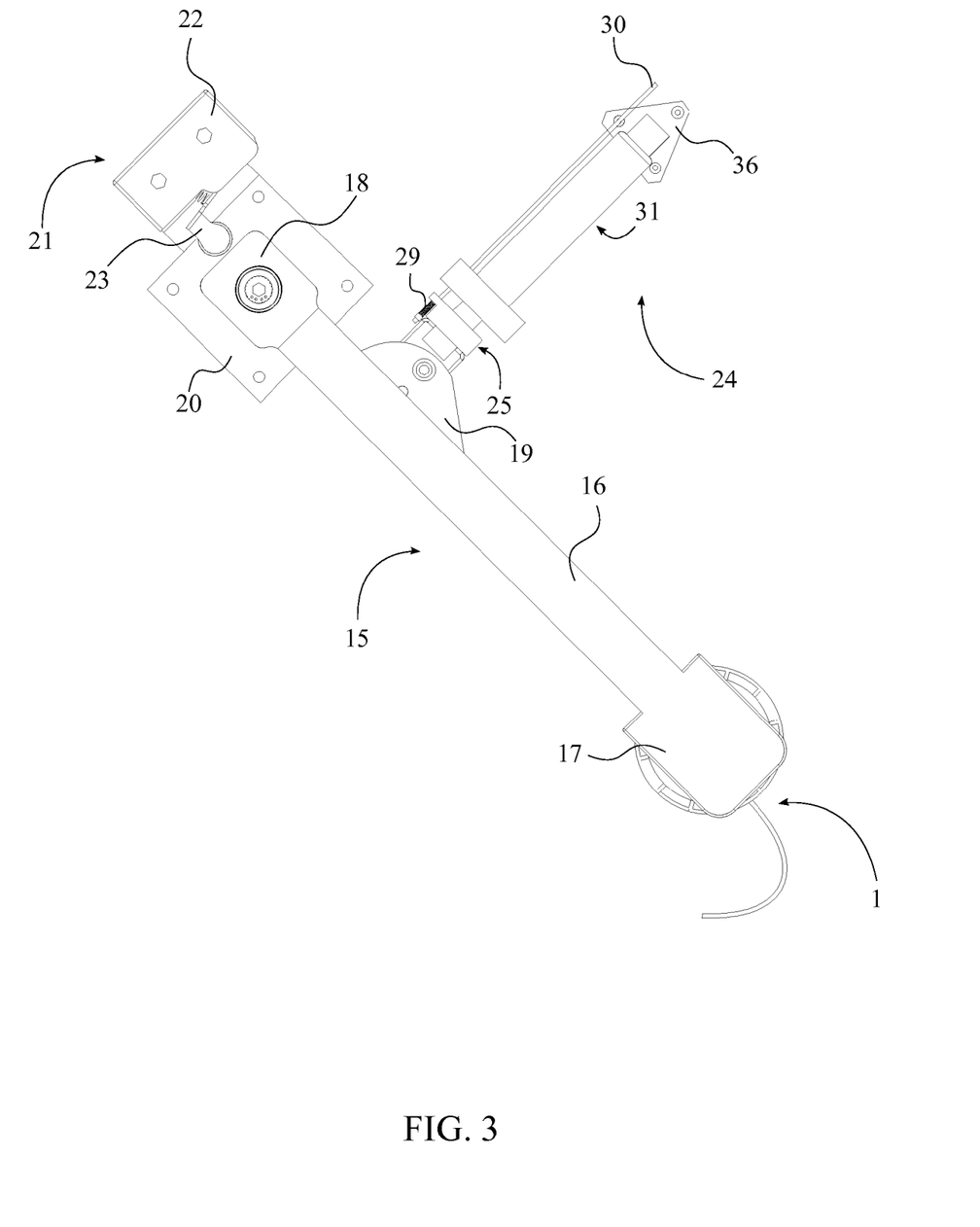
FIG. 3 is a top plan view of the attachable trimmer, showing the retracted position of the attachable trimmer.

Shown in FIG. 2 and FIG. 3 is the limit switch 21, where the on position of the limit switch 21 is shown in FIG. 2 and the off position of the limit switch 21 is shown in FIG. 3. The limit switch 21 comprises a switch bracket 23 and a switch box 22. The switch box 22 that houses all the electrical components is connected onto the base plate 20. The switch bracket 23 is connected to the switch box 22, where the switch bracket 23 is positioned in between the switch box 22 and the second end 18 of the pivot arm 16. The motor 12 is electrically connected with the switch box 22 so that the switch box 22 is able to power the motor 12 as the switch box 22 is electrically connected with an external power source. The external power source for the present invention can be the existing battery of the lawn mower or a secondary battery within the lawn mower. The switch bracket 23 functions as the on/off switch for the motor 12 as the switch bracket 23 makes contact with the second end 18 of the pivot arm 16. As shown in FIG. 2, when the pivot arm 16 is released from the retracted position into the expanded position through the turn lock, the switch bracket 23 is changed from an off-position to an on-position so that the motor 12 can be powered from the external power source as the switch bracket 23 completes the electrical circuitry within the present invention. As shown in FIG. 3, when the pivot arm 16 is retracted from the expanded position into the retracted position through the turn lock, the switch bracket 23 is changed from the on-position to the off-position so that the motor 12 is not powered from the external power source as the switch bracket 23 disconnects the electrical circuitry within the present invention. In the preferred embodiment of the present invention, the switch bracket 23 comprises a clamp and a circular disk, where clamp allows the circular disk to efficiently move along a back surface of the second end 18 of the pivot arm 16 as the arm assembly 15 is moved in between the expanded position and the retracted position.

The present invention has many different functions. The main function of the adjustable trimmer is to trim grass along edges. To engage the trimming unit 1, the user must operate the turn lock into the releasing position wherein the releasing position releases the tension of the cable 30. The air spring strut 31 is then released and the switch box 22 is at the on-position as the switch bracket 23 completes the electrical circuitry within the present invention. Once the switch box 22 is at the on-position, the trimmer head 2 spins rapidly and the roll of wire extends through the eyelet 4, spins, and cuts the grass. To shut down the trimming unit 1, the user must operate the turn lock into the locking position wherein the locking position pulls the cable 30. The air spring strut 31 is then retracted and the switch box 22 changes into the off-position as the switch bracket 23 disconnects the electrical circuitry within the present invention. When the switch box 22 is at the off-position, the trimmer head 2 stops spinning and the trimmer head 2 stops cutting grass. Another function of the present invention is to be able to retract at an angle that is needed when the pivot arm 16 and trimming unit 1 encounters any disturbance in its path. The arm assembly 15 is able to retract as needed because the of the air spring strut 31. For example, when the pivot arm 16 encounters any disturbance, the pivot arm 16 is pushed back towards the lawn mower, where the constant pressure in the air spring strut 31 increases as the piston rod 35 pushes further into the pressure tube 32. Once the pivot arm 16 and trimming unit 1 pass the disturbance along its path, the pivot arm 16 and trimming unit 1 return towards their original location and the arm assembly 15 is fully extended again as the constant pressure within the air spring strut 31 pushes the piston rod 35 back out of the pressure tube 32.

Although the invention has been explained in relation to its preferred embodiment, it is to be understood that many other possible modifications and variations can be made without departing from the spirit and scope of the invention as hereinafter claimed.

What is claimed is:

1. An attachable trimmer comprises;
a trimming unit;
an arm assembly;
a limit switch;
a rod assembly;
the trimming unit comprises a trimmer head, a central adaptor, and a motor housing;
the arm assembly comprises a pivot arm, a connector plate, and a base plate;
the rod assembly comprises a rod end assembly, a spring anchor, a cable, an air spring strut, a strut base;
the trimmer head being rotatably connected with the motor housing by the central adaptor;
the arm assembly being adjacently connected with the motor housing opposite of the trimmer head;
the limit switch being oppositely positioned of the motor housing across the arm assembly; and
the rod assembly being connected with the arm assembly in between the motor housing and the limit switch.

2. The attachable trimmer as claimed in claim 1 comprises;
the trimmer head comprises an outer housing, a linear spool, and an outer cover;
the central adaptor being concentrically connected with the outer housing;
a spool end of the central adaptor being internally positioned with the outer housing;
a motor end of the central adaptor being externally positioned with the outer housing opposite of the spool end;
the linear spool being concentrically attached with the spool end; and
the outer cover being perimetrically attached around the outer housing opposite of the motor end.

3. The attachable trimmer as claimed in claim 2 comprises;
the outer housing comprises an eyelet; and
the eyelet being laterally positioned on the outer housing.

4. The attachable trimmer as claimed in claim 1 comprises;
the motor housing comprises an outer casing and a motor;
a stator housing of the motor being internally connected with the motor housing; and
a rotor shaft of the motor being connected with a motor end of the central adaptor.

5. The attachable trimmer as claimed in claim 1 comprises;
the motor housing being connected with a first end of the pivot arm;
the base plate being pivotally connected with a second end of the pivot arm;
the base plate being oppositely positioned of the motor housing across the pivot arm; and
the connector plate being connected with the pivot arm and positioned in between the motor housing and the base plate.

6. The attachable trimmer as claimed in claim 1 comprises;
the limit switch comprises a switch box and a switch bracket;
the switch box being connected onto the base plate;
the switch bracket being connected to the switch box; and
the switch bracket being positioned in between the switch box and a second end of the pivot arm.

7. The attachable trimmer as claimed in claim 1 comprises;
the motor being electrically connected with the switch box; and
the switch box being electrically connected with an external power source.

8. The attachable trimmer as claimed in claim 1 comprises;
the connector plate being connected to the rod end assembly;
the air spring strut being connected to the rod end assembly opposite of the connector plate;
the strut base being connected to the air spring strut opposite of the rod end assembly;
the cable traversing through the air spring strut and the rod end assembly;
the spring anchor being connected to the cable; and
the spring anchor being adjacently positioned to the rod end assembly and the connector plate.

9. The attachable trimmer as claimed in claim 8 comprises;
the rod end assembly comprises an anchor, a securing member, and a cable inlet;
the securing member being connected with the connector plate;
the anchor being connected with the securing member opposite of the connector plate; and
the cable inlet being positioned on the anchor.

10. The attachable trimmer as claimed in claim 8 comprises;
the air spring strut comprises a pressure tube, a tube flange, a cable retainer, and a piston rod;
the pressure tube being adjacently connected with the strut base;
the tube flange being concentrically positioned around the pressure tube opposite of the strut base;
the cable retainer traversing through the tube flange;
the cable retainer being concentrically positioned with a cable inlet of the rod end assembly;
the piston rod traversing into the pressure tube and concentrically positioned with the pressure tube; and
the piston rod being connected with the anchor opposite of the pressure tube.

11. The attachable trimmer as claimed in claim 8, wherein the cable being traversing through a cable retainer of the air spring strut and a cable inlet of the rod end assembly.

12. An attachable trimmer comprises;
a trimming unit;
an arm assembly;

a limit switch;

a rod assembly;

the trimming unit comprises a trimmer head, a central adaptor, and a motor housing;

the arm assembly comprises a pivot arm, a connector plate, and a base plate;

the rod assembly comprises a rod end assembly, a spring anchor, a cable, an air spring strut, a strut base;

the trimmer head being rotatably connected with the motor housing by the central adaptor;

the arm assembly being adjacently connected with the motor housing opposite of the trimmer head;

the limit switch being oppositely positioned of the motor housing across the arm assembly;

the connector plate being connected with the pivot arm and positioned in between the motor housing and the base plate;

the connector plate being connected to the rod end assembly;

the air spring strut being connected to the rod end assembly opposite of the connector plate;

the strut base being connected to the air spring strut opposite of the rod end assembly;

the cable traversing through the air spring strut and the rod end assembly;

the spring anchor being connected to the cable; and the spring anchor being adjacently positioned to the rod end assembly and the connector plate.

13. The attachable trimmer as claimed in claim 12 comprises;

the trimmer head comprises an outer housing, a linear spool, and an outer cover;

the central adaptor being concentrically connected with the outer housing;

a spool end of the central adaptor being internally positioned with the outer housing;

a motor end of the central adaptor being externally positioned with the outer housing opposite of the spool end;

the linear spool being concentrically attached with the spool end; and the outer cover being perimetrically attached around the outer housing opposite of the motor end.

14. The attachable trimmer as claimed in claim 13 comprises;

the outer housing comprises an eyelet; and the eyelet being laterally positioned on the outer housing.

15. The attachable trimmer as claimed in claim 12 comprises;

the motor housing comprises an outer casing and a motor;

a stator housing of the motor being internally connected with the motor housing; and a rotor shaft of the motor being connected with a motor end of the central adaptor.

16. The attachable trimmer as claimed in claim 12 comprises;

the motor housing being connected with a first end of the pivot arm;

the base plate being pivotally connected with a second end of the pivot arm; and the base plate being oppositely positioned of the motor housing across the pivot arm.

17. The attachable trimmer as claimed in claim 12 comprises;

the limit switch comprises a switch box and a switch bracket;

the switch box being connected onto the base plate;

the switch bracket being connected to the switch box; and the switch bracket being positioned in between the switch box and a second end of the pivot arm.

18. The attachable trimmer as claimed in claim 12 comprises;

the motor being electrically connected with the switch box; and the switch box being electrically connected with an external power source.

19. The attachable trimmer as claimed in claim 12 comprises;

the rod end assembly comprises an anchor, a securing member, and a cable inlet;

the securing member being connected with the connector plate;

the anchor being connected with the securing member opposite of the connector plate; and the cable inlet being positioned on the anchor.

20. The attachable trimmer as claimed in claim 12 comprises;

the air spring strut comprises a pressure tube, a tube flange, a cable retainer, and a piston rod;

the pressure tube being adjacently connected with the strut base;

the tube flange being concentrically positioned around the pressure tube opposite of the strut base;

the cable retainer traversing through the tube flange;

the cable retainer being concentrically positioned with a cable inlet of the rod end assembly;

the piston rod traversing into the pressure tube and concentrically positioned with the pressure tube;

the piston rod being connected with the anchor opposite of the pressure tube; and the cable being traversing through the cable retainer and the cable inlet.

* * * * *